(12) United States Patent
Ferreol

(10) Patent No.: US 7,848,748 B2
(45) Date of Patent: Dec. 7, 2010

(54) METHOD FOR CHARACTERISING EMITTERS BY THE ASSOCIATION OF PARAMETERS RELATED TO THE SAME RADIO EMITTER

(75) Inventor: Anne Ferreol, Colombes (FR)

(73) Assignee: Thales (FR)

( * ) Notice: Subject to any disclaimer, the term of this patent is extended or adjusted under 35 U.S.C. 154(b) by 309 days.

(21) Appl. No.: 11/718,229

(22) PCT Filed: Oct. 25, 2005

(86) PCT No.: PCT/EP2005/055541

§ 371 (c)(1),
(2), (4) Date: Dec. 1, 2008

(87) PCT Pub. No.: WO2006/045803

PCT Pub. Date: May 4, 2006

(65) Prior Publication Data

US 2009/0305720 A1 Dec. 10, 2009

(30) Foreign Application Priority Data

Oct. 27, 2004 (FR) .................................. 04 11448

(51) Int. Cl.
*H04W 4/00* (2009.01)
(52) U.S. Cl. ................. 455/427; 342/417; 342/430; 342/449; 342/451; 342/465; 375/340; 375/322; 375/348

(58) Field of Classification Search ................ None
See application file for complete search history.

(56) References Cited

U.S. PATENT DOCUMENTS

| | | | |
|---|---|---|---|
| 2006/0068738 A1* | 3/2006 | Li et al. | 455/277.1 |
| 2008/0075033 A1* | 3/2008 | Shattil | 370/328 |
| 2008/0298339 A1* | 12/2008 | Alamouti et al. | 370/347 |
| 2009/0190697 A1* | 7/2009 | Awater et al. | 375/341 |

FOREIGN PATENT DOCUMENTS

FR       2 853 480 A    10/2004

OTHER PUBLICATIONS

Fiori S; Faba A; Albini L; Cardelli E; Burrascano P: "Numerical modeling for the localization and the assessment of electromagnetic field sources" IEEE Transactions of Magnetics, vol. 39, No. 3, May 2003, pp. 1638-1641, XP002331897 US.

(Continued)

*Primary Examiner*—Ajit Patel
(74) *Attorney, Agent, or Firm*—Lowe Hauptman Ham & Berner, LLP

(57) ABSTRACT

Method of using one or more transmitters and/or one or more parameters associated with a transmitter by using a reception station comprising a device suitable for measuring over time a set of K parameters dependent on the transmitters associated with vectors $\hat{\eta}_k$ representative of the transmitters for $1 \leq k \leq K$. The method includes a step of extracting the parameter or parameters consisting in grouping together by transmitter the parameters which are associated therewith by means of a technique of independent component analysis.

4 Claims, 2 Drawing Sheets

OTHER PUBLICATIONS

Gaoming Huang; Luxi Yang; Shenya He: "Application of blind source separation to a novel passive location" Proceedings ICA 2004, Springer-Verlag, vol. 3195, Sep. 2004, pp. 1134-1141, XP 002331898 Berlin.

Hyvorinen Aapo: "Fast and Robust Fixed-Point Algorithms for Independent Component Analysis" IEEE Transactions of Neural Networks, IEEE Inc, New York, US, 1999, pp. 1-17, XP002980698.

L.Albera, A.Ferreol, P.Chevalier and P.Comon. GRETSI 2003, Paris Sep. 2003, "ICAR, un algorithme de ICA à convergence rapide, robuste au bruit" [ICAR, a fast convergence, noise-robust ICA algorithm].

L.Albera, A.Ferreol and P.Chevalier. ICA2003, Nara (Japan), Apr. 2003, "Sixth order blind identification of undetermined mixtures (BIRTH) of sources".

P. Comon, Signal Processing, Elsevier, Apr. 1994, vol. 36, No. 3, pp. 287-314, "Independent Component Analysis, a new concept?".

O.Michel, P.Larzabal and H.Clergeot, "Test de détection du nombre de sources corrélées pour les méthodes HR en traitement d'antene" [Test for detecing the number of correlated sources for HR procedures in antenna processing]. GRETSI 91 in Juans les Pins, Sep. 1991.

J.F. Cardoso, A. Souloumiac, IEE Proceedings-F, vol. 140, No. 6, pp. 362-370, Dec. 1993, "Blind beamforming for non-gaussian signals".

* cited by examiner

METHOD FOR CHARACTERISING EMITTERS BY THE ASSOCIATION OF PARAMETERS RELATED TO THE SAME RADIO EMITTER

CROSS-REFERENCE TO RELATED APPLICATIONS

The present Application is based on International Application No. PCT/EP2005/055541, filed on Oct. 25, 2005, which in turn corresponds to French Application No. 0411448, filed on Oct. 27, 2004, and priority is hereby claimed under 35 USC §119 based on these applications. Each of these applications are hereby incorporated by reference in their entirety into the present application.

FIELD OF THE INVENTION

The invention relates notably to a passive method of locating fixed or mobile transmitters on the ground. The objective is notably to determine the position of one or more transmitters on the ground on the basis of a mobile reception system. It also applies in respect of configurations where the transmitters are at altitude and the reception system on the ground.

BACKGROUND OF THE INVENTION

The associating of parameters also makes it possible to characterize a transmitter by its signal-to-noise ratio. It is also possible to characterize an FH (Frequency Hopping) by its plateau durations, its frequencies of appearance and its direction of arrival. A modulation can also be characterized by identifying for example its amplitude state and phase state.

FIG. 1 illustrates airborne location with a mobile reception system, the transmitter 1 is at the position $(x_0, y_0, z_0)$, the carrier 2 at the instant $t_k$ is at the position $(x_k, y_k, z_k)$ and sees the transmitter 1 at the angle of incidence $(\theta(t_k, x_0, y_0, z_0), \Delta(t_k, x_0, y_0, z_0))$. The angles $\theta(t, x_0, y_0, z_0)$ and $\Delta(t, x_0, y_0, z_0)$ evolve over time and depend on the position of the transmitter and also the trajectory of the reception system. The angles $\theta(t, x_0, y_0, z_0)$ and $\Delta(t, x_0, y_0, z_0)$ are charted with the aid of an array of N antennas that can be fixed under the carrier as shown by FIG. 2.

The antennas Ai of the array receive the sources with a phase and amplitude that depend on the angle of incidence of the sources and also the position of the antennas.

Antenna processing techniques generally utilize the spatial diversity of the sources (or transmitters): use of the spatial position of the antennas of the array to better utilize the differences in incidence and in distance of the sources. Antenna processing breaks down into two main areas of activity:

1—Spatial filtering, illustrated in FIG. 3, the objective of which is to extract either the modulated signals $s_m(t)$, or the symbols contained in the signal (Demodulation). This filtering consists in combining the signals received on the array of sensors so as to form an optimal reception antenna for one of the sources. Spatial filtering can be blind or cooperative.

It is cooperative when there is a priori knowledge about the transmitted signals (directions of arrival, symbol sequences, etc.) and it is blind in the contrary case. It is used for blind source separation, filtering matched to direction of arrival (beam formation) or to replicas, multi-sensor MODEM (demodulation), etc.

2—The objective of estimating the parameters of the transmitters is to determine various parameters such as: their Doppler frequencies, their bit rates, their modulation indices, their positions $(x_m, y_m)$, their incidences $(\theta_m, \Delta_m)$ and their direction vectors $a(\theta_m, \Delta_m)$ (response of the array of sensors to a source with direction $(\theta_m, \Delta_m)$) etc.

For example, goniometry and blind identification procedures exist in this area:

The objective of goniometry is to determine the incidences $\theta(t, x_m, y_m, z_m)$ in 1D or the pair of incidences $(\theta(t, x_m, y_m, z_m), \Delta(t, x_m, y_m, z_m))$ in 2D. For this purpose, goniometry algorithms use the observations arising from the antennas or sensors. When the waves from all the transmitters propagate in the same plane, it suffices to apply a 1D goniometry, in other cases, a 2D goniometry.

The objective of blind identification procedures (ICA) is notably to determine the direction vectors $a(\theta_m, \Delta_m)$ of each of the transmitters.

The known location techniques according to the prior art generally use histogram techniques to group the parameters together. However, these techniques have the drawback of requiring a priori knowledge about the standard deviation of the parameters in order to fix the stepsize of the histogram.

SUMMARY OF THE INVENTION

The invention relies on a new approach consisting notably in judiciously associating the parameters related to one and the same transmitter.

The invention relates to a method for characterizing one or more transmitters and/or one or more parameters associated with a transmitter by using a reception station comprising a device adapted to measuring over time a set of K parameters dependent on the transmitters associated with vectors $\hat{\eta}_k$ representative of the transmitters for $1 \leq k \leq K$ characterized in that it comprises at least one step of extracting the parameter or parameters consisting in grouping together by transmitter the parameters which are associated therewith by means of a technique of independent component analysis.

The method according to the invention has notably the following advantages:

It does not require any parameter of settings and no a priori knowledge about the statistics of the parameters, it makes it possible to count the number of transmitters on the basis of the number of dominant values of a covariance matrix of the parameters ($\hat{R}_{xx}$): use of the techniques for detecting the number of sources of the goniometry, it makes it possible to identify as many parameter vectors ($\eta_m$) as desired, it makes it possible to use the step of associating the parameters of different nature such as the incidence of the sources, their signal-to-noise ratio or else their direction vectors, it makes it possible to determine the mean incidence of each incident transmitter on the basis of the measured incidences, to perform the mean location of each incident transmitter on the basis of the measured direction vectors or the measured incidences, to extract the phase states of a modulation on the basis of the real and imaginary parts of the signal of a linear modulation, to separate the Frequency Hopping, FH, signals by measuring the plateau durations and incidences: an FH is characterized by a single incidence and a single plateau.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
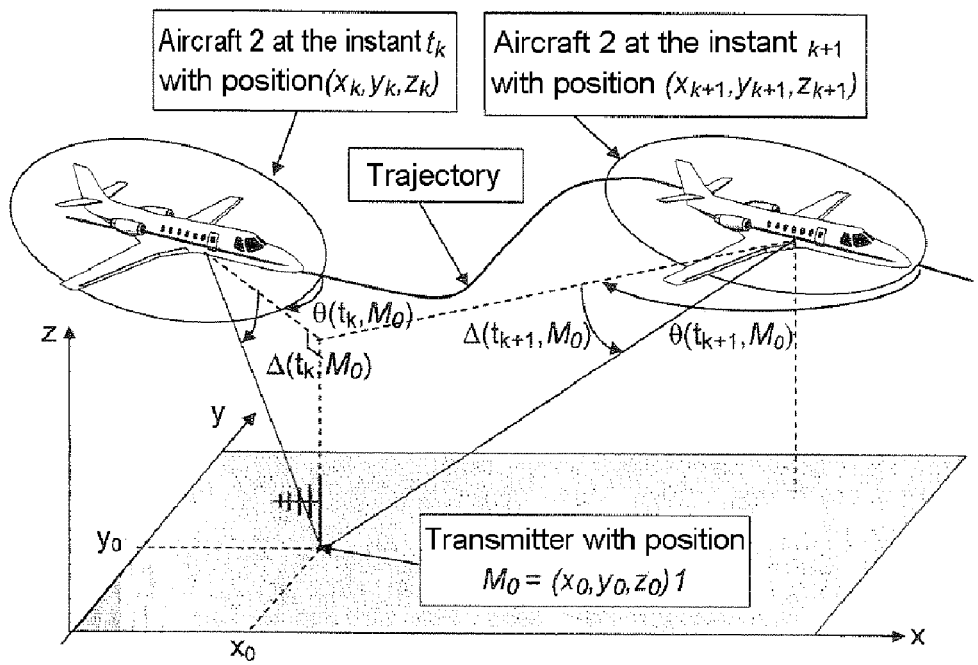
FIG. 1 an example of airborne location with a mobile reception system,
FIG. 2 an array of 5 antennas,
FIG. 3 a diagram of spatial filtering by beam formation in one direction,
FIGS. 4, 5 and 6 a numerical example of the use of the method according to the invention.
Figure 2:
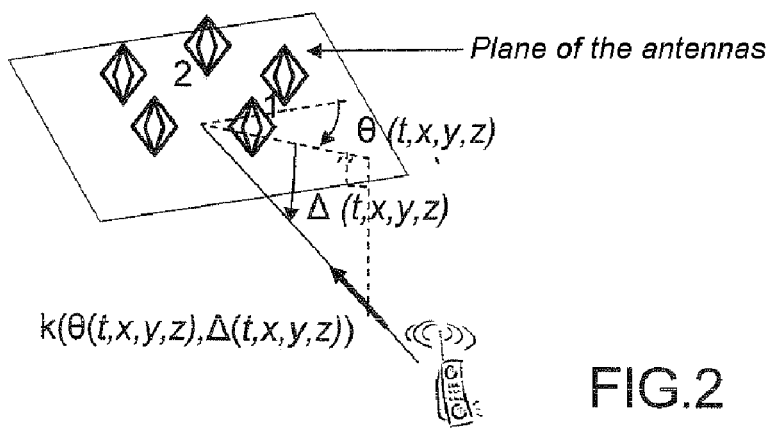
Figure 3:
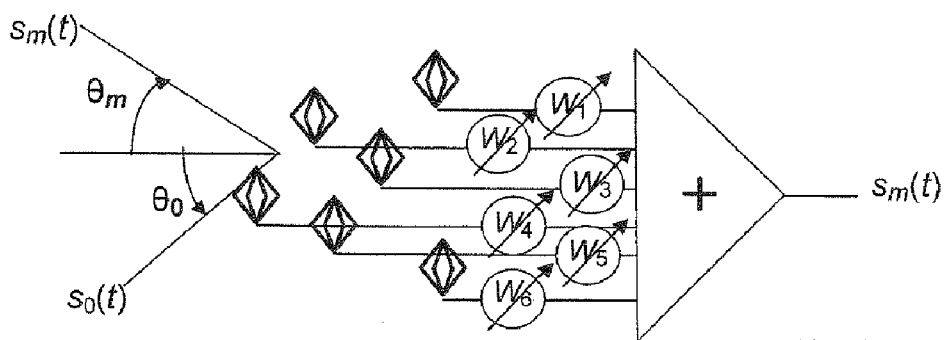

The following example is given in conjunction with FIG. 1, comprising a transmitter 1 to be located by using an aircraft 2 equipped with devices allowing the measurement of parameters associated with the transmitters, and a processor suitable for executing the steps according to the invention.

In the presence of M transmitters, a location system measures, for example over time, a set of K parameters (representative of the transmitting sources) characterized by the vectors $\eta_k$ for $1 \leq k \leq K$. The vectors $\eta_k$ are for example composed of the azimuth $\theta_k$ and of the signal-to-noise ratio $SNR_k$ of one of the transmitters at the instant $t_k$: $\eta_k = [\theta_k \ SNR_k]^T$ where $(^T)$ denotes the transpose of a vector.

This vector can also be composed of the direction vector $a(\theta_k)$ of one of the sources and of its signal-to-noise ratio: $\eta_k = [a(\theta_k)^T \ SNR_k]^T$.

More generally the $k^{th}$ measurement $\hat{\eta}_k$ is marred by an error and is associated with the $m^{th}$ transmitter in the following manner:

$$\hat{\eta}_k = \eta_m + e_k \text{ for } 1 \leq k \leq K \text{ and } 1 \leq m \leq M \qquad (1)$$

where $e_k$ is the noise vector associated with the $k^{th}$ measurement and $\eta_m$ the parameter vector associated with the $m^{th}$ transmitter.

The invention consists notably in extracting the M vectors $\eta_m$ associated with a transmitter m in the midst of the K measurements $\hat{\eta}_k$.

Procedure for Identifying the Parameter Vectors of the Principal Sources

By virtue of the location system with which the aircraft is equipped or more generally a system performing parameter measurements, K measurements $\hat{\eta}_k$ are available. The prime objective of the invention is to identify the M vectors $\eta_m$ associated with the M incident transmitters.

For this purpose, the method comprises a first step consisting in transforming the measured vectors $\hat{\eta}_k$ into vectors $f(\hat{\eta}_k)$ of larger dimension.

For a goniometry system in azimuth $\theta_k$ where the vector $\hat{\eta}_k$ is equal to $[SNR_k]^T$ (azimuth and signal-to-noise ratio), the transformation step consists in performing the following bijective transformation:

$$f\left(\hat{\eta}_k = \begin{bmatrix} \hat{\theta}_k \\ SNR_k \end{bmatrix}\right) = \begin{bmatrix} 1 \\ \exp(j\hat{\theta}_k) \\ \vdots \\ \exp(jL\hat{\theta}_k) \\ SNR_k \end{bmatrix} \qquad (2)$$

For a goniometry system in azimuth $\theta_k$ and in elevation $\Delta_k$ where the vector representative of the set of parameters K measured for the M transmitters $\hat{\eta}_k = [\theta_k \Delta_k SNR_k]^T$ the transformation step consists in performing the following bijective transformation:

$$f\left(\hat{\eta}_k = \begin{bmatrix} \hat{\theta}_k \\ \hat{\Delta}_k \\ SNR_k \end{bmatrix}\right) = \begin{bmatrix} 1 \\ \exp(j\hat{\theta}_k) \\ \exp(j\hat{\Delta}_k) \\ \exp(j\hat{\theta}_k)\exp(j\hat{\Delta}_k) \\ \vdots \\ SNR_k \end{bmatrix} \qquad (3)$$

For a goniometry system in the presence of FH signals whose incidences $\hat{\theta}_k$ and plateau durations $\hat{T}_k$ have been measured, the vector $\hat{\eta}_k$ may be written: $\hat{\eta}_k = [\hat{\theta}_k \hat{T}_k]^T$. The transformation step for $\hat{\eta}_k$ consists in performing the following bijective transformation:

$$f\left(\hat{\eta}_k = \begin{bmatrix} \hat{\theta}_k \\ \hat{T}_k \end{bmatrix}\right) = \begin{bmatrix} 1 \\ \hat{\theta}_k \\ \hat{T}_k \end{bmatrix} \qquad (4)$$

For a system seeking to extract the phase states of a transmitter from the signal x(kT) of the BPSK, the vector $\hat{\eta}_k$ may be written:

$$\hat{\eta}_k = \begin{bmatrix} \Re(x(kT)) \\ \Im(x(kT)) \end{bmatrix} \qquad (5)$$

Where $\Re(z)$ and $\Im(z)$ denote the real and imaginary parts of the complex z and T is the symbol rate. In the case of a BPSK transmitter with 2 phase states, M=2 states are present, such that:

$$\eta_1 = \begin{bmatrix} \cos(\varphi) \\ \sin(\varphi) \end{bmatrix} \text{ and } \eta_2 = \begin{bmatrix} -\cos(\varphi) \\ -\sin(\varphi) \end{bmatrix} \qquad (6)$$

The determination of the vectors $\eta_1$ and $\eta_2$ will make it possible to deduce the phase rotation $\phi$ of the BPSK. In this case it is possible to construct the following vector $f(\hat{\eta}_k)$:

$$f(\hat{\eta}_k) = \begin{bmatrix} 1 \\ \Re(x(kT)) \\ \Im(x(kT)) \end{bmatrix} \qquad (7)$$

The length of the vector $f(\hat{\eta}_k)$ determines the maximum number of identifiable transmitters. In an application of goniometric type that estimates the incidences $\theta$ or $(\theta, \Delta)$, it is possible to say for example that this maximum number will not exceed the number of sensors of the array that enabled the goniometry.

On the basis of the $K \geq \dim(\bullet f(\hat{\eta}_k))$ vectors $f(\hat{\eta}_k)$ the method thereafter calculates the following covariance matrix:

$$\hat{R}_{xx} = \frac{1}{K} \sum_{k=1}^{K} [f(\hat{\eta}_k) \otimes f(\hat{\eta}_k)][f(\hat{\eta}_k) \otimes f(\hat{\eta}_k)]^H \quad (8)$$

where $\otimes$ denotes the Kronecker product such that $u \otimes v = [u(1)v^T u(2)v^T \ldots]$ and $(\bullet)^H$ the conjugate transpose.

This matrix $\hat{R}_{xx}$ may also be written:

$$\hat{R}_{xx} = \sum_{m=1}^{M} r\rho_m[f(\eta_m) \otimes f(\eta_m)][f(\eta_m) \otimes f(\eta_m)]^H + R_{bb} \quad (9)$$

where $R_{bb}$ is a noise matrix and $\rho_m$ is the number of vectors $f(\hat{\eta}_k)$ associated with the vector $f(\eta_m)$.

The matrix $\hat{R}_{xx}$ is the covariance matrix of the K observations $f(\hat{\eta}_k) \otimes f(\hat{\eta}_k)$ According to equation (9) it reduces to the covariance matrix of the signatures $f(\eta_m) \otimes f(\eta_m)$ of the M transmitters. Knowing that the signatures $f(\eta_m) \otimes f(\eta_m)$ are all different since the transmitters are associated with different parameters, the principal components of the matrix $\hat{R}_{xx}$ (eigenvectors associated with the M largest eigenvalues) define the same space as the M signatures $f(\eta_m) \otimes f(\eta_m)$ of the transmitters: $\hat{R}_{xx}$ is completely related to the vector space of the M signatures $f(\eta_m) \otimes f(\eta_m)$ of the transmitters.

The rank of the matrix $\hat{R}_{xx}$ is thus equal to the number of transmitters M. This rank can be determined from the eigenvalues of this matrix.

Thus in the presence of a vector $f(\hat{\eta}_k)$ of dimension N, the matrix $\hat{R}_{xx}$ is of dimension $N^2 \times N^2$ and it is then possible to identify at most $N^2$ transmitters.

The method thereafter comprises a step of identifying the transformed vectors $f(\eta_m)$ on the basis of $\hat{R}_{xx}$ so as thereafter to deduce therefrom the parameter vectors $\eta_m$ of each of the transmitters.

For this purpose the first operation consists in decomposing the matrix $\hat{R}_{xx}$ into eigenelements to obtain its eigenvalues.

On the basis of the eigenvalues of the matrix, it is possible to determine the number of sources M by applying, for example, the procedure described in reference [4] or any other "enumeration" procedure which makes it possible to count the number of principal components of the matrix $\hat{R}_{xx}$. This number in the given example is related to the number M of transmitters.

On the basis of the M eigenelements associated with the largest eigenvalues $\lambda_m$ it is possible to determine the square root of the matrix $\hat{R}_{xx}$:

$$\hat{R}_{xx}^{1/2} = E_s \Lambda_s^{1/2} = B\Omega^{1/2} U^H \text{ such that } B = \quad (10)$$
$$[f(\eta_1) \otimes f(\eta_1) \ldots f(\eta_M) \otimes f(\eta_M)] \text{ and}$$
$$\Omega = \text{diag}\{\rho_1 \ldots \rho_M\}$$

where diag{ . . . } is a diagonal matrix composed of the elements of { . . . }, $E_s$ and $\Lambda_s = \text{diag}\{(\lambda_1 \ldots \lambda_M)\}$ are composed respectively of the eigenvectors and eigenvalues of $\hat{R}_{xx}$ associated with the M largest eigenvalues: $\lambda_1 \geq \ldots \geq \lambda_M$.

The columns of the matrix B are composed of the signatures $f(\eta_m) \otimes f(\eta_m)$ of each of the transmitters.

The matrix U is unitary ($U^H U = I_M$ where $I_M$ is the identity matrix of dimension N×N). Knowing that the columns of the square root $\hat{R}_{xx}^{1/2}$ are in the same space as the columns $f(\eta_m) \otimes f(\eta_m)$ of the matrix B, the matrix U is a change of basis matrix. The matrix U is moreover unitary since its columns are mutually orthogonal vectors. Subsequently in the description the method will use this orthogonality property to identify the matrix U. For the identification of U the method will moreover use the redundant structure of B which is related to the Kronecker product $\otimes$.

The determination of U is done for example by utilizing the redundant structure of the matrix B, i.e.:

$$B = \begin{bmatrix} A\Phi_1 \\ \vdots \\ A\Phi_N \end{bmatrix} \quad (11)$$

with $$A = [f(\eta_1) \ldots f(\eta_M)]$$

and $$\Phi_n = \text{diag}\{f_n(\eta_1) \ldots f_n(\eta_M)\}$$

where $f_n(\eta_m)$ is the $n^{th}$ component of the vector $f(\eta_m)$ of dimension N×1.

Under these conditions the matrix $\hat{R}_{xx}^{1/2}$ is composed of N sub-blocks $\Gamma_n$ such that:

$$\hat{R}_{xx}^{1/2} = \begin{bmatrix} \Gamma_1 \\ \vdots \\ \Gamma_N \end{bmatrix} = BU^H \text{ with } \Gamma_n = A\Phi_n U^H \quad (12)$$

The columns of each matrix $\Gamma_n$ are in the same vector space as the sought-after signatures $f(\eta_m)$ of each of the M transmitters. The matrices $\Gamma_n$ differ by change of basis matrices which are equal to a diagonal matrix to within the sought-after unitary matrix U. These properties of the matrices $\Gamma_n$ depend on the redundant structure of the matrix B.

Accordingly the following matrices $\Psi_{ij}$:

$$\Psi_{ij} = \Gamma_i^\# \Gamma_j = U\Phi_i^{-1}\Phi_j U^H \quad (13)$$

all have the matrix U as matrix of eigenvectors ($\#$ denotes the pseudo inverse such that $\Gamma_\# = (\Gamma^H \Gamma)^{-1} \Gamma^H$).

The method uses the unitary character of the matrix U to identify it: The columns of U are orthogonal vectors.

Under these conditions, to determine the unitary matrix U, the joint diagonalization of the JADE procedure described for example in reference [5] of the following matrices or of any other procedure known to the person skilled in the art is performed:

$$\Psi_{ij} \text{ for } (1 \leq i \leq N \text{ and } j < i) \quad (14)$$

Once the matrix U has been estimated, it is possible to deduce therefrom the matrix B to within an amplitude by performing according to relation (10):

$$\hat{B} = B\Omega^{1/2} = \hat{R}_{xx}^{1/2} U =$$
$$[f(\eta_1) \otimes f(\eta_1)\sqrt{\rho_1} \ldots f(\eta_M) \otimes f(\eta_M)\sqrt{\rho_M}] \quad (15)$$

Knowing that the $m^{th}$ column of the matrix $\hat{B}$ may be written $b_m=[b_{m1}{}^T \ldots b_{mN}{}^T]^T=f(\eta_m)\otimes f(\eta_m)\sqrt{\rho_m}$ it is transformed into the following matrix $B_m$:

$$B_m=[b_{m1}\ldots b_{mN}]=f(\eta_m)f(\eta_m)^T\sqrt{\rho_m} \quad (16)$$

where the $b_{mi}$ are vectors of dimensions N×1.

Knowing that the $1^{st}$ component of $f(\eta_m)$ is equal to 1, $f(\eta_m)$ is deduced from $B_m$ by taking the singular vector $e_m$ of $B_m$ associated with the largest singular value and by performing $f(\eta_m)=e_m/e_m(1)$ where $e_m(1)$ is the first component of the vector $e_m$. The method performs this normalization since the vectors $f(\eta_k)$ are always constructed with a first component equal to 1. These steps of constructing $f(\eta_k)$ and normalizing $e_m$ make it possible to resolve the phase ambiguity of the singular vectors $e_m$.

The M principal vectors $\eta_m$ are deduced from the transformed vectors $f(\eta_m)$ since $f(\bullet)$ is bijective.

Having identified the M principal vectors $\eta_m$, the method compiles for example statistics on the components of each of the vectors. For an application of location type this step makes it possible notably to give in addition to the mean position of the transmitter, an error bracket for the estimation of the position.

For example for the vector $\eta_m=.[\theta_m\ SNR_m]^T$ ($1\leq m\leq M$), the method determines the statistics of the azimuth $\theta_m$ (bias and standard deviation) so as to give the value of the azimuth within a bracket.

The first step consists in determining the set $\Phi_m$ of vectors $\hat{\eta}_k$ associated with the transmitter having mean vector $\eta_m$.

Knowing that:

$$(F^HF)^{-1}F^Hf(\eta_m)=\delta_m=\begin{bmatrix}0_{m-1}\\1\\0_{M-m}\end{bmatrix} \quad (17)$$

with $$F=[f(\eta_1)\ \ldots\ f(\eta_M)]$$

where $0_L$ is a zero vector of dimension L×1.

Thus all the components of $\delta_m$ are zero with the exception of the $m^{th}$ which equals 1. It should be noted that the filtering matrix $(F^HF)^{-1}F^H$ is a separator of the transmitters: By applying this filter to a signature $f(\eta_m)$ of the $m^{th}$ transmitter only the component associated with this transmitter is nonzero.

Thus to determine the set $\Phi_m$ to which the vector $\hat{\eta}_k$ belongs, the method uses the property of equation (17) (where the objective of the matrix $(F^HF)^{-1}F^H$ is to separate the transmitters) by calculating the vector $\beta_k$ of equation (14) which ought to be close to $\delta_m$ when $f(\hat{\eta}_k)$ is associated with the $m^{th}$ source.

$$(F^HF)^{-1}F^Hf(\hat{\eta}_k)=\beta_k \quad (18)$$

The vector $\hat{\eta}_k$ belongs to the set $\Phi_m$ of the $m^{th}$ source if the $m^{th}$ component $\beta_k(m)$ of largest modulus satisfies: $|\beta_k(m)|>\alpha$.

The threshold $\alpha$ is chosen close to 1 (typically $\alpha=0.9$).

The steps of the method of constructing the sets $\Phi_m$ in the presence of K vectors $\hat{\eta}_k$ comprise for example the following steps:

Step R.1 k=1 and initialization of the M sets $\Phi_m$ to $\emptyset$ (empty set), Step R.2 Calculation of the vector $\beta_k$ using equation (18).

Step R.3 Search for the component $\beta_k(i_{max})$ such that: $|\beta_k(i_{max})|>\beta_k(i)$ for $i\neq i_{max}$.

Step R.4 If $|\beta_k(i_{max})|>\alpha$ then $\Phi_{imax}=\{\Phi_{imax}\hat{\eta}_k\}$, Step R.5 k←k+1, Step R.6 If k<K return to step R.2.

Once the M sets $\Phi_m=\{\hat{\eta}_k$ close to $\eta_m\}$ have been determined, the method calculates a statistic of the components of the vector $\eta_m$ for example as Mean Square Error or MSE.

The Mean Square Error (MSE) of the $i^{th}$ component of $\eta_m$ may be written:

$$MSE_m(i)^2=\frac{1}{card(\Phi_m)}\sum_{\hat{\eta}_k\in\Phi_m}(\hat{\eta}_k(i)-mean_m(i))^2 \text{ with} \quad (19)$$

$$mean_m(i)=\frac{1}{card(\Phi_m)}\sum_{\hat{\eta}_k\in\Phi_m}\hat{\eta}_k(i)$$

where card $(\Phi_m)$ is the cardinal of the set $\Phi_m$ and $mean_m(i)$ is the mean value that has to be close to $\eta_m(i)$.

Figure 4:
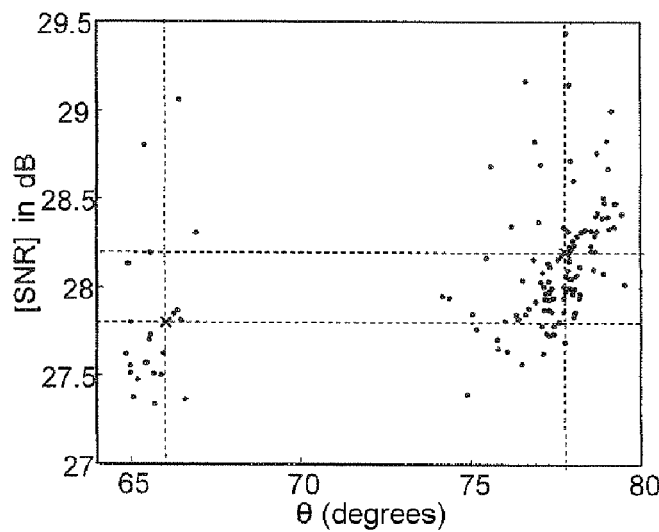
Figure 5:
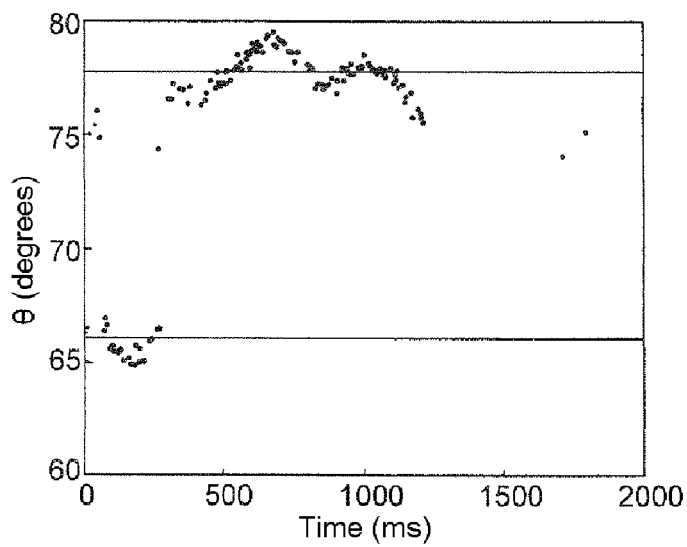

In the example of FIGS. 4 and 5 the vector $\hat{\eta}_k=[\theta_k{}^T SNR_k]^T$ and the function $f(\bullet)$ satisfy:

$$f\left(\hat{\eta}_k=\begin{bmatrix}\hat{\theta}_k\\SNR_k\end{bmatrix}\right)=\begin{bmatrix}1\\\exp(j\hat{\theta}_k)\\\exp(2j\hat{\theta}_k)\\SNR_k\end{bmatrix} \quad (20)$$

The following FIG. 4 shows the distribution of the goniometry plots in the $(\theta_k, SNR_k)$ space:

and FIG. 5, the evolution of these plots over time:

The method gives for the M=2 sources:
$\theta_1=66.06°$ and $SNR_2=27.78$ dB
$\theta_2=77.77°$ and $SNR_2=28.17$ dB In FIGS. 4 and 5, the mean values estimated by the method appear as a solid line.

Figure 6:
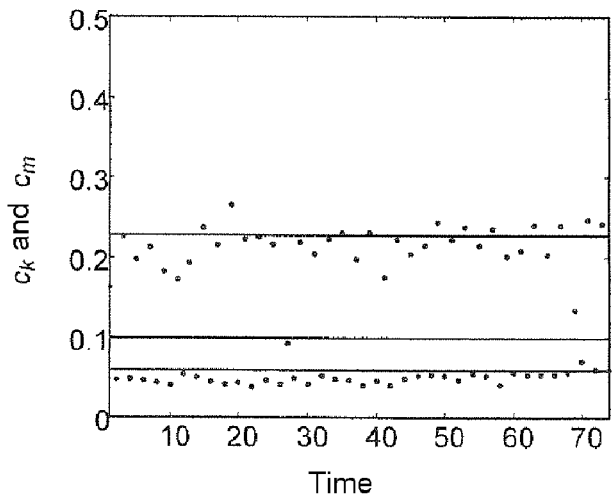

In the example of FIG. 6 the vector $\hat{\eta}_k=[a(\theta_k)^T SNR_k]^T$ and the function $f(\bullet)$ satisfy:

$$f(\hat{\eta}_k)=\begin{bmatrix}1\\a(\hat{\theta}_k)\\SNR_k/(\max(SNR_k)-\min(SNR_k))\end{bmatrix} \quad (21)$$

In FIG. 6 the coefficients $c_k=|1^Ha(\hat{\theta}_k)|$ are represented dotted and the coefficients $c_m=|1^H a(\theta_m)|$ as a solid line, where the direction vector $a(s_m)$ has been deduced from the M vectors $s_m$ estimated by the method.

The vector 1 is composed of 1 s.

The method has detected M=3 categories of sources.

FIG. 6 shows that two of the categories are permanently present while the last is present in a much more sporadic manner.

These examples show that the method is applied in an independent manner to the type of parameters of the sources.

Without departing from the scope of the invention, the method can be applied in respect of directions of arrival $\theta_m$, direction vectors $a(\theta_m)$ or else signal-to-noise ratios $SNR_m$.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

BIBLIOGRAPHY

[1] L. ALBERA, A. FERREOL, P. CHEVALIER and P. COMON. GRETSI 2003, Paris, September 2003, "ICAR, un algorithme de ICA à convergence rapide, robuste au bruit" [ICAR, a fast convergence, noise-robust ICA algorithm].
[2] L. ALBERA, A. FERREOL and P. CHEVALIER. ICA2003, Nara (Japan), April 2003, Sixth order blind identification of undetermined mixtures (SIRBI) of sources.
[3] P. COMON, Signal Processing, Elsevier, April 1994, vol. 36", No. 3, pp 287-314, Independent Component Analysis, a new concept~?.
[4] O. MICHEL, P. LARZABAL and H. CLERGEOT Test de détection du nombre de sources corrélées pour les méthodes HR en traitement d'antenne [Test for detecting the number of correlated sources for HR procedures in antenna processing]. GRETSI 91 in Juans les Pins.
[5] J. F. CARDOSO, A. SOULOUMIAC, IEE Proceedings-F, Vol. 140, No. 6, pp. 362-370, Dec. 1993. Blind beamforming for non-gaussian signals.

The invention claimed is:

1. A method of using one or more transmitters and/or one or more parameters associated with a transmitter by using a reception station having a device suitable for measuring over time a set of K parameters dependent on the transmitting associated with vectors $\hat{\eta}_k$ representative of the transmitters for $1<k<K$ comprising the steps of:
 extracting the parameter or parameters consisting in grouping together by transmitter the parameters which are associated therewith by means of a technique of independent component analysis, wherein the step of associating the parameters for each transmitter M comprises at least the following steps:
Step No. 1 transforming the vectors $\hat{\eta}_k$ representative of the set of the K parameters for the M transmitters into vectors $f(\hat{\eta}_k)$ by using a bijective function $\tilde{f}(\ )$ and where the 1$^{st}$ component of $f(\hat{\eta}_k)$ being equal to 1,
Step No. 2 determining a covariance matrix $\hat{R}_{xx}$ the vectors $f(\hat{\eta}_k)$ and decomposing it into eigenelements, so as to obtain its eigenvalues, where $\hat{R}_{xx}$ is a matrix related to the vector space of the M signatures $f(\eta_m) \otimes f(\eta_m)$ of the transmitters,
Step No. 3 calculating the rank M of the matrix $\hat{R}_{xx}$ its eigenvalues found in step 2,
Step No. 4 calculating a square root of $\hat{R}_{xx}$ its M dominant eigenelements: $\hat{R}_{xx}^{1/2} = E_s \Lambda_s^{1/2}$ where $E_s$ corresponds to the eigenvectors and $\Lambda_s$ to the M largest eigenvalues,
Step No. 5 deducing from $\hat{R}_{xx}^{1/2}$ the matrices $\Gamma_n$ according to $$\hat{R}_{xx}^{1/2} = \begin{bmatrix} \Gamma_1 \\ \vdots \\ \Gamma_N \end{bmatrix} = BU^H$$

with $\Gamma_n = A\Phi_n U^H$ and from the $\Gamma_n$ calculating $\Psi_{ij}$ according to $\Psi_{ij} = \Gamma_i^\# \Gamma_j = U\Psi_i^{-1}\Psi_j U^H$ for ($1 \leq i \leq N$ and $j<i$), where the columns of each matrix $\Gamma_n$ define the same space vector as the signatures $f(\eta_m)$ of the M transmitters,
Step No. 6 identifying unitary matrix U by joint diagonalization of the $\Psi_{ij}$ for ($1 \leq i \leq N$ and $j<i$),
Step No. 7 determining the vectors $f(\eta_m)$ from the columns $b_m$ of the matrix $\hat{R}_{xx}^{1/2} U$ where U is the unitary matrix: Transformation of column $b_m$ into the matrix $B_m$ according to $B_m = [b_{m1} \ldots b_{mN}] = f(\eta_m)f(\eta_m)^T \sqrt{\rho_m}$ and extraction of this matrix from the singular vector $e_m$ associated with the largest singular value so as to perform $f(\eta_m) = e_m/e_m(1)$ with $e_m(1)$ the component of the vector $e_m$, and
Step No. 8 applying the inverse transform of the function $\tilde{f}(\ )$ so as to deduce therefrom the vectors $\eta_m$.

2. The method as claimed in claim 1 comprising at least one step of evaluating the statistics of the components of the vectors $\eta_m$ found.

3. The method as claimed in claim 2 comprising a step of evaluating the mean and the standard deviation of the incidences of each of the transmitters.

4. The method as claimed in claim 2 comprising at least the following steps:
 determining the M sets $\Phi_m$ of vectors $\hat{\eta}_k$ associated with the principal vector $\eta_m$; and
 determining the statistics of the components of the vector $\eta_m$ from the set $\Phi_m$ by using a Mean Square Error procedure.

* * * * *